United States Patent [19]
Yokota

[11] Patent Number: 4,926,263
[45] Date of Patent: May 15, 1990

[54] SYNCHRONIZING CIRCUIT FOR OPTICAL SCANNING APPARATUS

[75] Inventor: Kenji Yokota, Kanagawa, Japan

[73] Assignee: Fuji Photo Film Co., Ltd., Kanagawa, Japan

[21] Appl. No.: 246,386

[22] Filed: Sep. 19, 1988

[30] Foreign Application Priority Data

Sep. 18, 1987 [JP] Japan .................. 62-234409

[51] Int. Cl.⁵ .................. H04N 1/04; H04N 1/36
[52] U.S. Cl. .................. 358/474; 358/409
[58] Field of Search .................. 358/285, 264, 265

[56]  References Cited

U.S. PATENT DOCUMENTS

| | | | |
|---|---|---|---|
| 4,146,908 | 3/1979 | Vandling | 358/264 |
| 4,203,075 | 5/1980 | Wessler | 358/264 |
| 4,349,847 | 9/1982 | Traino | 358/267 |
| 4,683,499 | 7/1987 | Kuwabara | 358/265 |
| 4,689,690 | 8/1987 | Aagano | 358/265 |
| 4,713,690 | 12/1987 | Watanabe | 358/264 |
| 4,800,442 | 1/1989 | Riseman | 358/283 |

FOREIGN PATENT DOCUMENTS

| | | |
|---|---|---|
| 57-3187 | of 1982 | Japan . |
| 57-3188 | of 1982 | Japan . |
| 58-104565 | of 1983 | Japan . |
| 60-153295 | of 1985 | Japan . |
| 60-126862 | 7/1985 | Japan . |
| 60-153259 | 8/1985 | Japan . |
| 61-126862 | of 1986 | Japan . |
| 61-150567 | of 1986 | Japan . |
| 61-227423 | of 1986 | Japan . |
| 61-296815 | of 1986 | Japan . |

OTHER PUBLICATIONS

Document #57-3188; Date:1-82; Country: Japan.

Primary Examiner—Edward L. Coles, Sr.
Assistant Examiner—Jerome Grant, II
Attorney, Agent, or Firm—Sughrue, Mion, Zinn, Macpeak & Seas

[57] ABSTRACT

Disclosed is a synchronizing circuit for an optical scanning apparatus in which synchronization of writing of an image in the horizontal direction is achieved using a synchronizing signal generated in response to the output signal of an photo sensor for detecting the light which has passed through a scanning means. The synchronizing circuit includes a frequency dividing circuit for dividing the frequency of a clock pulse train having a predetermined frequency in response to the output signal from the photo sensor, a delay circuit for successively delaying the phase of the frequency divided clock pulse train by a predetermined time interval when it produces output signals, and a selecting circuit for selecting as a synchronizing signal the output of the delay circuit whose phase difference is at a minimum with respect to the output of the photo sensor.

11 Claims, 4 Drawing Sheets

SYNCHRONIZING CIRCUIT FOR OPTICAL SCANNING APPARATUS

BACKGROUND OF THE INVENTION

1. Field of the Invention:

The present invention relates to a synchronizing circuit for an optical scanning apparatus, and, more particularly, to a synchronizing circuit for determining the starting point of horizontal scanning conducted by an optical scanning apparatus.

2. Description of the Related Art:

Conventionally, writing of an image conducted by an optical scanning apparatus employed as a laser printer is timed by a synchronizing circuit such as that shown in FIG. 4 which generates a synchronizing signal when a photo sensor disposed outside an image recorded area detects the passage of a laser beam. Such a synchronizing circuit includes a clock pulse oscillator 71 for generating a clock pulse signal having a frequency of k times that of a synchronizing signal (having a frequency of $f_0$), and a frequency dividing circuit 72 for dividing the frequency $kf_0$ of the generated clock pulse signal by k. The synchronizing circuit generates a synchronizing signal by starting to divide the frequency of the clock pulse signal when the signal emerges after the passage of the laser beam has been detected by the optical sensor. In this synchronizing circuit, since the frequency division is started when the clock pulse signal emerges, the detection signal from the photo sensor and the synchronizing signal are out of phase by a time interval in which one cycle of the clock pulse signal occurs or less, i.e., by a time interval corresponding to one-kth of the period of the synchronizing signal or less.

A synchronizing circuit such as that shown in FIG. 5 is also known which includes an oscillator 73 for generating a clock pulse signal (having a frequency of $f_0$), a delay circuit 74 with k taps which receives the output of the oscillator 73 and successively delays the phase of the clock pulse signal by a time interval corresponding to one-kth of the period of the clock pulse signal, and a selecting circuit 75 for suitably selecting as a synchronizing signal the output of the delay circuit whose phase difference is at a minimum with respect to a detection signal from the photo sensor (see Japanese Patent Laid-Open No. 56-126378). In this synchronizing circuit, since the clock pulse signal is successively delayed by a time interval corresponding to one-kth of the period thereof, the detection signal from the photo sensor and the synchronizing signal are out of phase by a time interval corresponding to the delay time or less, i.e., by a time interval corresponding to one-kth of the period of the clock pulse signal (which is equal to the period of the resultant synchronizing signal) or less.

Techniques relevant to the present invention includes those disclosed in the specifications of Japanese Patent Laid-Open No. 57-3187, Japanese Patent Laid-Open No. 57-3188, Japanese Patent Laid-Open No. 58-104565, Japanese Patent Laid-Open No. 60-153259, Japanese Patent Laid-Open No. 61-126862, Japanese Patent Laid-Open No. 61-150567, Japanese patent Laid-Open No. 61-227423, and Japanese Patent Laid-Open No. 61-296815.

In the above-described synchronizing circuits utilizing a frequency dividing circuit, since the output of the photo sensor and the resultant synchronizing signal are out of phase by a time interval corresponding to one-kth of the period of the synchronizing signal, a clock pulse oscillator for oscillating a signal having a high frequency of $kf_0$ is required in order to minimize this phase difference, making the oscillator complicated and expensive.

With the synchronizing circuits employing a delay circuit, minimization of the phase difference is achieved by shortening the delay time. This is in turn achieved by increasing the number of taps in the delay circuit, making the delay circuit complicated. In particular, in a case where character information is recorded on a microfilm in dots utilizing a laser beam, a resolution which is as high as about 3360 dots/7.2 mm is required, making the phase difference a crucial matter.

SUMMARY OF THE INVENTION

In view of the above-described problems of the prior art, an object of the present invention is to provide a synchronizing circuit for an optical scanning apparatus which is capable of effectively minimizing the phase difference between the output of a photo sensor and a resultant synchronizing signal with a simple structure without employing an oscillator for outputting a signal having a high frequency or without requiring a delay circuit with a large number of taps.

The above-described object of the present invention is attained by the provision of a synchronizing circuit for an optical scanning apparatus in which synchronization of writing of an image in the horizontal direction is achieved using a synchronizing signal generated in response to the output of an optical sensor for detecting the light which has passed through a scanning means, which comprises: an oscillator for generating a series of clock pulses having a predetermined frequency; a frequency dividing circuit for dividing the frequency of the clock pulse train generated from the oscillator when a signal is output from the photo sensor; a delay circuit for successively delaying the phase of the clock pulse train whose frequency has been divided by the frequency dividing circuit by a predetermined time interval; and a selecting circuit for selecting as a synchronizing signal the output of the delay circuit whose phase difference is at a minimum with respect to the output of the photo sensor, wherein synchronization is achieved using the synchronizing signal which has been selected from the output signals of the delay circuit.

In the present invention, the frequency dividing circuit divides the frequency of the clock pulse train output from the oscillator since a signal is output from the photo sensor. The delay circuit successively delays the phase of the frequency divided clock pulse train by a predetermined time interval. The selecting circuit selects among the output signals of the delay circuit a clock pulse train whose phase difference is at a minimum with respect to the output from the photo sensor, and outputs a selected signal as a synchronizing signal. Since the synchronizing circuit of the present invention employs the frequency dividing circuit and the delay circuit, the phase difference can be minimized without increasing the frequency of a clock pulse signal or without increasing the number of taps in the delay circuit. Assuming that the synchronizing circuit generates a synchronizing signal having a frequency of $f_0$ and a period of T whose phase difference is at 1/nm or less, a clock pulse train having a frequency of $nf_0$ is generated by the oscillator. The frequency dividing circuit divides the frequency of the clock pulse train by n when a signal is output from the photo sensor. The signal output from the frequency dividing circuit and the output from the photo sensor are therefore out of phase by a time interval corresponding to one-nth of the period of the clock pulse train or less. The delay circuit produces, from the frequency divided signal, m signals whose phase has been successively delayed by a time interval corresponding to one-nmth of the period T of the clock pulse signal. This allows the signal output from the delay circuit and the output from the photo sensor to be out of phase by a time interval corresponding to one-nmth of the period of the frequency divided signal or less. The selecting circuit selects from the output signals of the delay circuit a signal whose phase difference is at a minimum with respect to the output of the photo sensor, and outputs a selected signal as the synchronizing signal. In consequence, the output of the photo sensor and the synchronizing signal are out of phase only by a time interval corresponding to one-nm of the period of the synchronizing signal or less.

Thus, the present invention has an advantage in that it is capable of effectively suppressing the phase difference of the synchronizing signal without requiring a clock pulse oscillator for generating a high frequency as required in the prior art, or without requiring a complicated delay circuit.

DETAILED DESCRIPTION OF THE PREFERRED EMBODIMENT

Figure 1:
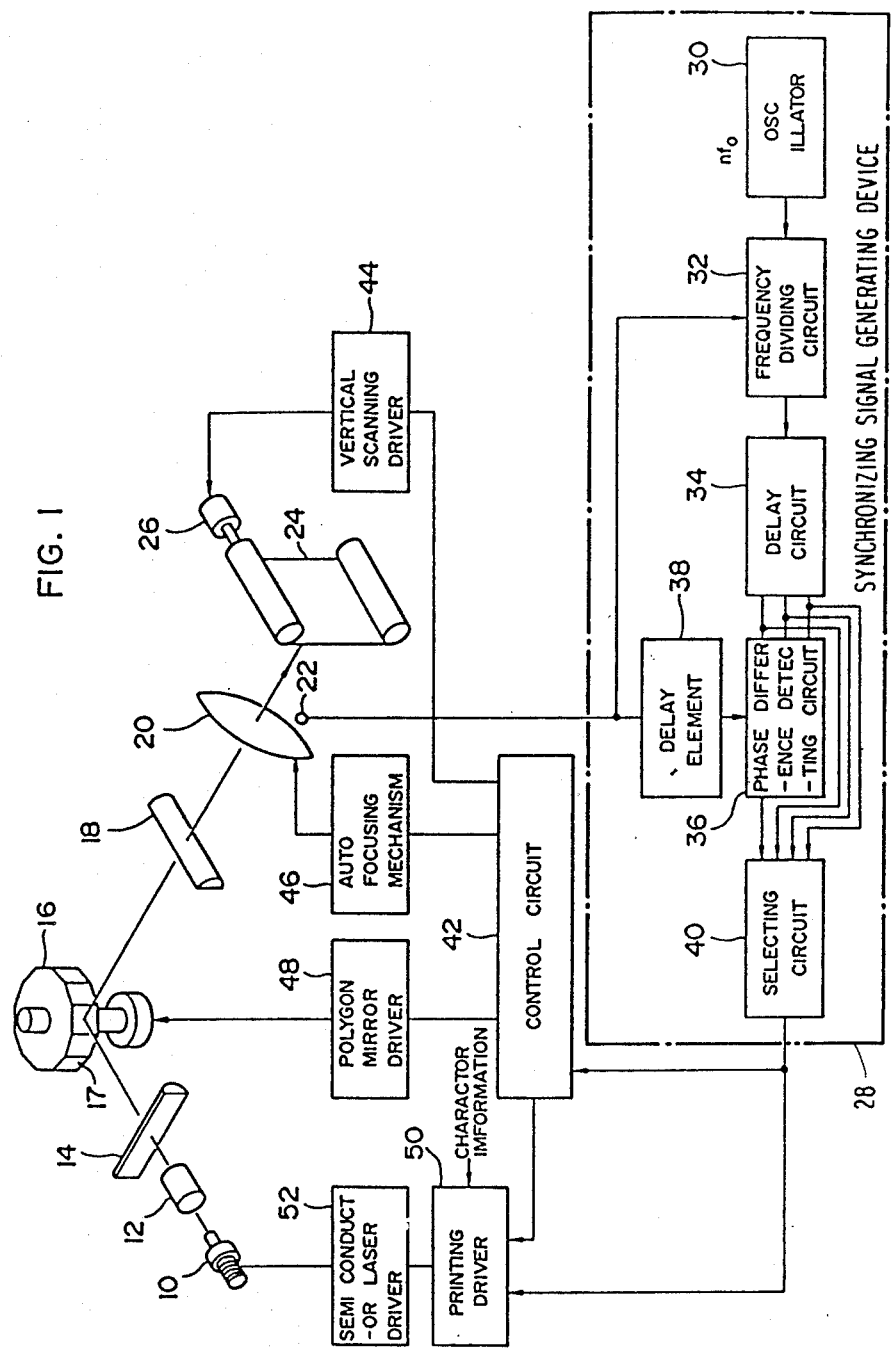
FIG. 1 is a block diagram of an embodiment of the present invention.

The present invention will be hereinunder described in detail with reference to the accompanying drawings. FIG. 1 is a block diagram of optical and control systems of an optical beam recording apparatus for recording character information or the like on a microfilm to which the present invention is applied. This optical system of the optical beam recording apparatus is of the type which moves the recording laser beam on a recording material in the horizontal direction. The control system thereof is adapted to control this optical system while conveying the recording material in the vertical direction at a predetermined speed.

The optical system will be first described with reference to FIGS. 1 and 2. The optical system includes a semiconductor laser 10 which is on-off controlled when it oscillates a laser beam. The laser beam oscillated from the semiconductor laser 10 is collimated by a collimator lens 12 disposed in the path of radiating laser beam, is condensed by a cylindrical lens 14, and then reaches a rotary polygon mirror 16. The polygon mirror 16 has a plurality of reflecting surfaces 17 for deflecting the laser beam in the horizontal direction. A cylindrical lens 18 is disposed at the side of the polygon mirror 16 to which the laser beam is reflected. A scanning lens 20 is disposed in the path of radiating laser beam, and a recording material 24 is located at the focal surface of the scanning lens 20.

Next, the control system of the optical beam recording apparatus will be described. As shown in FIG. 1, the control system includes a photo sensor 22 which is disposed between the scanning lens 20 and the recording material 24. The photo sensor 22 is separated from the optical path corresponding to the starting point of horizontal scanning of the laser beam radiated from the scanning lens 20, toward the outside of a recorded area by a predetermined distance indicated by L, as shown in FIG. 2. The photo sensor 22 is connected to a synchronizing signal generating device 28 for generating a synchronizing signal which is a fixed-width pulse train in response to a trigger signal output from the photo sensor 22 when the photo sensor 22 receives the laser beam. The synchronizing signal generating device 28 includes an oscillator 30 for generating a clock pulse signal having a frequency of $nf_0$. The output terminal of the oscillator 30 is connected to a frequency dividing circuit 32 for dividing the frequency of the clock pulse signal by n. The photo sensor 22 is also connected to this frequency dividing circuit 32. The output terminal of the frequency dividing circuit 32 is connected to a delay circuit 34 with m taps, which is in turn connected to a phase difference detecting circuit 36. The delay circuit 34 successively delays the output of the frequency dividing circuit by a time interval corresponding to T-nmth where T represents the period of the clock pulse signal. The photo sensor 22 is also connected to the phase difference detecting circuit 36 through a delay element 38. The delay element 38 is adapted to delay the trigger signal by a time interval corresponding to T-nth. The output terminal of the phase difference detecting circuit 36 is connected to a selecting circuit 40 for selecting a synchronizing signal. The synchronizing signal generating device 28 is connected to a printing driver 50 which receives from a computer character information. The output terminal of the printing driver 50 is connected to a semiconductor laser driver 52 for on-off controlling the semiconductor laser 10 in response to a signal output from the printing driver 50. A control circuit 42 which may be a microcomputer connected to the printing driver 50 is also connected to the driving section of the polygon mirror 16 through a polygon mirror driver 48, to the scanning lens 20 through an auto-focusing mechanism 46, and to a motor 26 for conveying the recording material 24 in the direction opposite to the vertical scanning direction, through a vertical scanning driver 44.

The operation of this embodiment will be described now with reference to FIGS. 1 and 2. The laser beam produced from the semiconductor laser 10 is radiated to the polygon mirror 16 through the collimator lens 12 and the cylindrical lens 14. The laser beam reflected by the polygon mirror 16 is moved along the recording material 24 through the cylindrical lens 18 and the scanning lens 20. When the photo sensor 22 disposed between the scanning lens 20 and the recording material 24 receives the laser beam, it outputs a trigger signal such as that shown in FIG. 3 B to the synchronizing signal generating device 28. Assume that the synchronizing signal generating device 28 generates a synchronizing signal having a frequency of 22.2 MHz (a period of 45 ns) within a phase difference of 5 ns. Where $n=3$, the oscillator 30 outputs a clock pulse train having a frequency of 66.6 MHz. The frequency dividing circuit 32 divides the frequency of the clock pulse train (FIG. 3 A) which is output from the oscillator 30 by 3 using the trigger signal (FIG. 3 B) from the photo sensor 22 so as to produce a clock pulse train having a frequency of 22.2 MHz (FIG. 3 C). Subsequently, the delay circuit 34 successively delays the clock pulse train whose frequency has been divided by the frequency dividing circuit 32 by 5 ns where m=3, and outputs the thus-produced three clock pulse trains (FIG. 3 D, E, and F) to the phase difference detecting circuit 36 and the selecting circuit 40. Concurrently with this, the delay element 38 which serves as a delay means delays the trigger signal (FIG. 3 B) of the photo sensor 22 by a certain time interval (for example, 15 ns) so as to enable it to be synchronized with the clock pulse trains (FIG. 3 D, E, and F), and outputs the thus-delayed signal to the phase difference detecting circuit 36 as a phase difference detection trigger signal (FIG. 3 G). The phase difference detecting circuit 36 outputs to the selecting circuit 40 a phase difference determining signal 1 (FIG. 3 H) when it detects a clock pulse train (FIG. 3 E) whose phase difference is at a minimum with respect to the phase difference detection trigger signal, as well as a phase difference determining signal 0 for the other clock pulse trains. The selecting circuit 40 logically performs the AND operation on the phase difference determining signals (FIG. 3 H) and three clock pulse trains (FIG. 3 D, E, and F), and selects one clock pulse train (FIG. 3 E) as a synchronizing signal. The thus-selected synchronizing signal (FIG. 3 E) has a frequency of 22.2 MHz (period of 45 ns), and its phase shifts from that of the output of the photo sensor by 5 ns or less.

Figure 2:
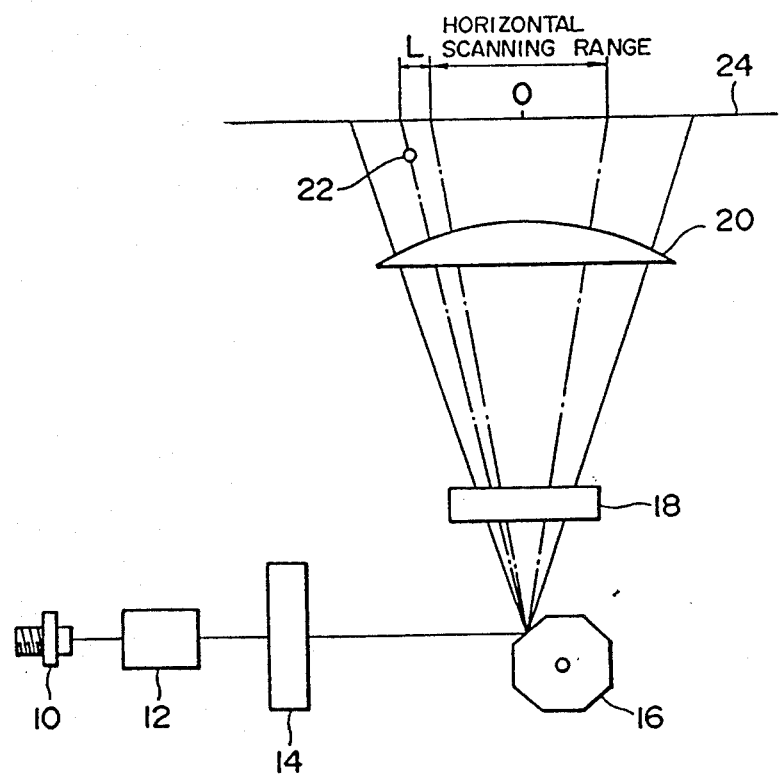
FIG. 2 is a diagram of an optical system of the embodiment of FIG. 1.
Figure 3:
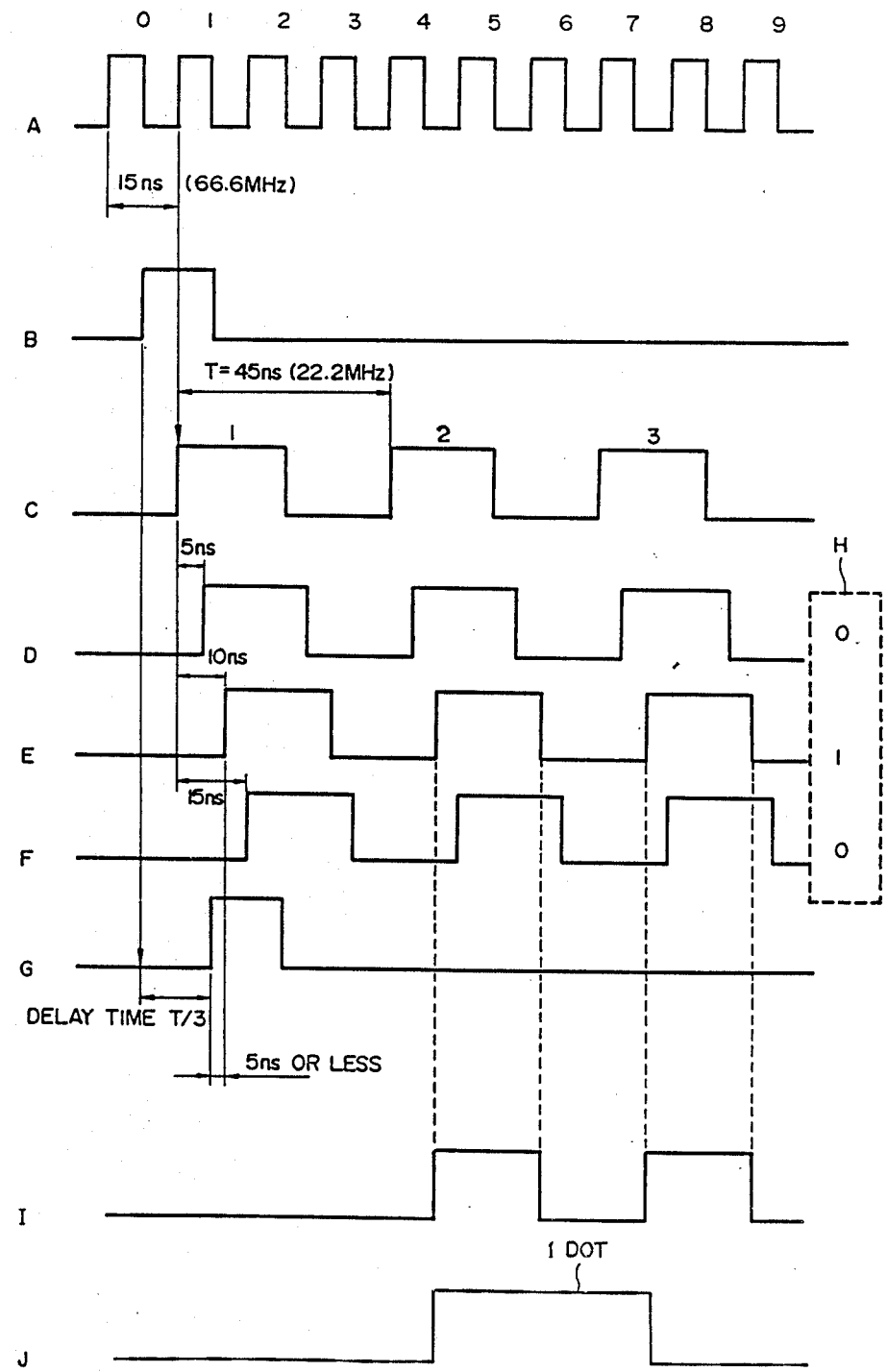
FIG. 3 illustrates the waveforms of signals employed by a control system of the embodiment of FIG. 1.
Figure 4:
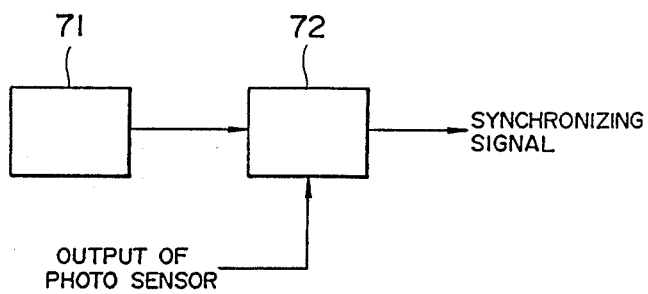
FIG. 4 is a block diagram of a conventional synchronizing circuit for an optical scanning apparatus.
Figure 5:
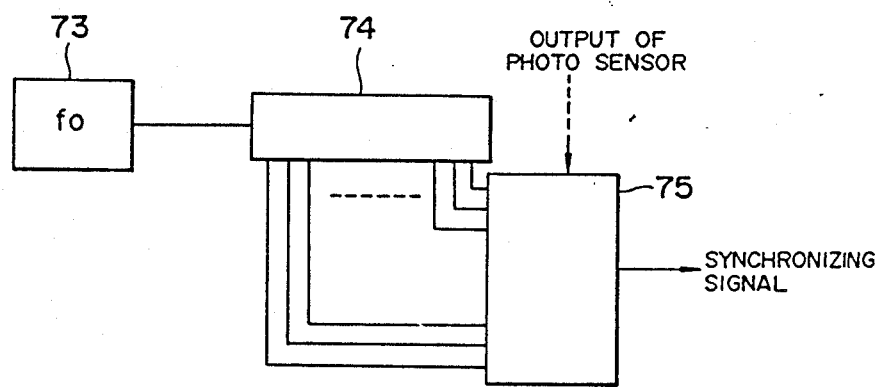
FIG. 5 is a block diagram of another conventional synchronizing circuit for the optical scanning apparatus.

The synchronizing signal (FIG. 3 E) is delivered to the printing driver 50 (FIG. 3 I) when the number of pulses corresponding to the time required for the laser beam to move through a distance L shown in FIG. 2 after the photo sensor 22 has received the laser beam radiated from the scanning lens 20 has been counted. The printing driver 50 forms a dot signal (FIG. 3 J) on the basis of the synchronizing signal (FIG. 3 I) using character information which has been input to the printing driver 50 from a computer (not shown), and delivers a resultant dot signal to the semiconductor laser driver 52. The dot signal is then supplied to the semiconductor laser 10 to on-off control it. In other words, the semiconductor laser 10 radiates a laser beam when the dot signal is at a high level. The synchronizining signal which has been output from the synchronizing signal generating device 28 is also input to the control circuit 42. The control circuit 42 rotates on the basis of the synchronizing signal the motor 26 through the vertical scanning driver 44 at a fixed speed for vertical scanning since the horizontal scanning is started. Also, the control circuit 42 automatically controls the position of the scanning lens 20 through the auto-focusing mechanism 46 so that a fine light spot is formed on the recording material 24.

Thus, in this embodiment, the frequency of a clock pulse train which is 66.6 MHz and which is three times that of the synchronizing signal is divided by 3 using the output of the photo sensor, and the phase of the frequency divided signal is then succesively delayed by 5 ns which is one-third of the period of the clock pulse signal. A clock pulse train which is closest in phase with the output of the photo sensor is selected as a synchronizing signal, and synchronization of the writing of an image in the horizontal direction is achieved using the thus-formed synchronizing signal. In consequence, the resultant synchronizing signal and the output of the photo sensor are out of phase only by a time interval corresponding to one-ninth of the period of the synchronizing signal (5 ns) or less. Further, an oscillator for outputting a clock pulse train having a frequency three times that of the synchronizing signal is required, and a delay circuit having a small size is needed to achieve accurate phase synchronization (with a phase difference of 5 ns or less) due to provision of three delayed clock pulse trains.

What is claimed is:

1. A synchronizing circuit for an optical scanning apparatus in which synchronization of writing of an image in the horizontal direction is achieved using a synchronizing signal generated in response to the output of an photo sensor for detecting the light which has passed through a scanning means, comprising:

an oscillator for generating a series of clock pulses having a predetermined frequency;

a frequency dividing circuit for dividing the frequency of the clock pulse train generated from said oscillator when a signal is output from said photo sensor;

a delay circuit for successively delaying the phase of the clock pulse train having the frequency divided by said frequency dividing circuit by a predetermined time interval; and a selecting circuit for selecting as a synchronizing signal the output of said delay circuit whose phase difference is at a minimum with respect to the output of said photo sensor.

2. A synchronizing circuit for an optical scanning apparatus according to claim 1, further including a delay means for producing a predetermined time interval between a signal imposed on its input from said photo sensor and the appearance of the same signal at its output; and a phase difference detecting circuit for receiving the output of said delay circuit and the output of said delay means and for outputting a phase difference determining signal to said selecting circuit so as to allow it to select as a synchronizing circuit an output of said delay circuit whose phase difference is at a minimum with respect to the output of said photo sensor.

3. A synchronizing circuit for an optical scanning apparatus according to claim 2, wherein said phase difference detecting circuit is adpated to output a first phase difference determining signal in response to detection of an output signal from said delay circuit whose phase difference is at a minimum with respect to the output signal from said delay means, as well as a second phase difference determining signal which is different from said first phase difference determining signal and which is output in response to detection of another output signals from said delay circuit.

4. A synchronizing circuit for an optical scanning apparatus according to claim 3, wherein said first phase difference determining signal comprises a logical 1 signal while said second phase difference determining signal comprises a logical 0 signal.

5. A synchronizing circuit for an optical scanning apparatus according to claim 3, wherein said selecting circuit performs the AND operation on the output signals of said phase difference detecting circuit and the output signals of said delay circuit so as to select the output of said delay circuit which is most closest in phase.

6. A synchronizing circuit for an optical scanning apparatus according to claim 1, wherein said frequency dividing circuit starts to divide the frequency of said clock pulse train when said clock pulse train emerges.

7. A synchronizing signal generating circuit applied to an optical scanning apparatus, said synchronizing signal generating circuit generating a synchronizing signal used to achieve synchronization of writing of an image in the horizontal direction in response to a signal output from a photo sensor which outputs a signal when it detects a light moved in the horizontal scanning direction by a horizontal scanning means, comprising:

an oscillator for generating a series of clock pulses having a predetermined frequency;

a frequency dividing circuit for receiving the output signal of said photo sensor and the clock pulse train and for dividing the frequency of said clock pulse train to a predetermined value when it receives the output signal of said photo sensor;

a delay circuit for receiving the clock pulse train whose frequency has been divided and for successively delaying the position of said clock pulse train by a predetermined time interval when it produces output signals;

a delay element for receiving the output signal of said photo sensor and for producing a predetermined time interval between input said signal of said photo sensor and the appearance of the same signal at its output;

a phase difference detecting circuit for receiving the output signal of said delay circuit and the output signal of said delay element and for outputting a phase difference determining signal when it detects among the output signals of said delay circuit the output signal whose phase difference is at a minimum with respect to the output signal of said delay element; and a selecting circuit for receiving the output signals of said delay circuit and said phase difference determining signal and for selecting among the output signals of said delay circuit said output signal which is most closest in phase on the basis of said phase difference determining signal.

8. A synchronizing signal generating circuit for use in an optical scanning apparatus according to claim 7, wherein said phase difference detecting circuit is adpated to output a first phase difference determining signal in response to detection of the output signal from said delay circuit whose phase difference is at a minimum with respect to the output signal from said delay element, as well as a second phase difference determining signal which is different from said first phase difference determining signal and which is output in response to detection of another output signals from said delay circuit.

9. A synchronizing signal generating circuit for use in an optical scanning apparatus according to claim 8, wherein said first phase difference determining signal comprises a logical 1 signal while said second phase difference determining signal comprises a logical 0 signal.

10. A synchronizing circuit for an optical scanning apparatus according to claim 8, wherein said selecting circuit performs the AND operation on the output signals of said phase difference detecting circuit and the output signals of said delay circuit so as to select the output of said delay circuit which is most closest in phase.

11. A synchronizing circuit for an optical scanning apparatus according to claim 7, wherein said frequency dividing circuit starts to divide the frequency of said clock pulse train when said clock pulse train emerges.

* * * * *